United States Patent
Lee et al.

[11] Patent Number: 5,872,663
[45] Date of Patent: Feb. 16, 1999

[54] APPARATUS AND METHOD FOR FABRICATING A DEFLECTION MIRROR TOWER

[75] Inventors: Neville K. Lee, Sherbourn; Amit Jain, Marlboro; Roy E. Martin, Westminster, all of Mass.

[73] Assignee: Quantum Corporation, Milpitas, Calif.

[21] Appl. No.: 303,895

[22] Filed: Aug. 16, 1994

Related U.S. Application Data

[63] Continuation of Ser. No. 847,455, Mar. 6, 1992, abandoned.

[51] Int. Cl.$^6$ ............... G02B 5/04; G02B 5/08; G02B 5/10; G02B 7/182
[52] U.S. Cl. .......... 359/833; 359/851; 359/853; 359/869; 359/884; 359/900
[58] Field of Search ............ 359/833, 834, 359/850, 851, 852, 853, 867, 868, 869, 855, 884, 589, 900; 369/34, 112, 100

[56] References Cited

U.S. PATENT DOCUMENTS

| | | |
|---|---|---|
| 2,900,884 | 8/1959 | Coleman ............... 359/833 |
| 3,244,776 | 4/1966 | Sheldon . |
| 3,588,220 | 6/1971 | Wells et al. ............ 359/869 |
| 3,940,609 | 2/1976 | Johnstun ............... 359/833 |
| 4,195,913 | 4/1980 | Dourte et al. . |
| 4,241,126 | 12/1980 | Nicolas et al. . |
| 4,364,884 | 12/1982 | Traut . |
| 4,475,027 | 10/1984 | Pressley ............... 359/858 |
| 4,518,232 | 5/1985 | Dagenais ............... 359/853 |
| 4,620,230 | 10/1986 | Spiger ................... 359/851 |
| 4,692,583 | 9/1987 | Kimura et al. ......... 359/859 |
| 4,770,824 | 9/1988 | Blom . |
| 4,999,142 | 3/1991 | Fukushima et al. . |
| 5,260,928 | 11/1993 | Lee et al. .............. 369/112 |
| 5,307,336 | 4/1994 | Lee et al. .............. 369/112 |
| 5,452,283 | 9/1995 | Lee et al. .............. 369/112 |
| 5,532,884 | 7/1996 | Lee et al. .............. 359/833 |

FOREIGN PATENT DOCUMENTS

| | | | |
|---|---|---|---|
| 3005621 | 8/1981 | Germany ............... 359/884 |
| 0028487 | 3/1981 | Japan ..................... 359/884 |
| 0015101 | 8/1984 | Japan ..................... 359/869 |
| 0131501 | 7/1985 | Japan ..................... 359/884 |
| 0101815 | 5/1988 | Japan ..................... 359/850 |
| 3-172802 | 7/1991 | Japan ..................... 359/867 |

OTHER PUBLICATIONS

Ream; "A Convlx Beam Intergrator"; Laser Focus; Nov. 1979; pp 68–71.

*Primary Examiner*—Ricky D. Shafer
*Attorney, Agent, or Firm*—David B. Harrison; Debra A. Chun; John C. Chen

[57] ABSTRACT

A deflection mirror tower (DMT) of a multiple-disk array, optical storage system includes a plurality of prism members, each having an angular mirror surface, arranged along a vertical axis of the DMT and configured at a predetermined angular orientation to deflect a laser beam to a respective disk surface. The DMT is generally fabricated using a two-level partitioning process. Several prepared glass substrates, i.e., one for each mirror type, are initially sliced into bars having predetermined geometries. A bar from each substrate is sequentially aligned to a master reference and bonded to adjacent bars to form an intermediate bar stack. The stack is then segmented into a plurality of DMT components, each having a plurality of prism members.

13 Claims, 7 Drawing Sheets

APPARATUS AND METHOD FOR FABRICATING A DEFLECTION MIRROR TOWER

This application is a continuation division, of application Ser. No. 07/847,455, filed Mar. 6, 1992, now abandoned.

FIELD OF THE INVENTION

This invention relates generally to optical systems and, more specifically, to a deflection mirror tower for an optical storage device.

BACKGROUND OF THE INVENTION

Conventional optical storage devices typically employ a single optical disk having a single recording surface for storing information. Use of a single disk allows the optical components, e.g., a mirror, to be arranged relative to the recording surface in a manner that optimizes the size and cost of the device. Although this results in a low-cost device having a relatively small form factor, its storage capacity is limited to that provided by a single surface. Copending and commonly assigned U.S. patent application of Lee et al., for OPTICAL STORAGE SYSTEM, filed herewith, describes a multiple-surface system in which the beam from a single laser is steered by a stationary galvanometer-rotated mirror to optical heads associated with the respective recording surfaces. The heads are mounted on a carriage that moves them radially over the surfaces for access to selected data tracks on the surfaces.

Specifically, the rotating mirror selectively directs the beam to one of a vertical array of uniquely oriented deflection mirrors. When a deflection mirror receives the beam, it reflects it along a plane parallel to and close to a corresponding disk surface. The beam then passes through an imaging lens on the way to a 45° mirror that redirects the beam radially toward an objective lens in the optical head associated with that surface. The objective lens, in turn, converges the beam on a small spot on the selected data track.

Therefore, it is apparent that the deflection mirrors must be precisely positioned. Moreover, the mirror array must be small to provide compatibility with a form factor for the overall system that is comparable with that of conventional multiple-disk magnetic disk drives. Further, the array must be manufactured within the cost constraints of prior single-disk optical components.

Several fabrication techniques might be employed to produce a deflection mirror array. One approach involves the construction of a precast housing and bonding of the individual mirrors thereto. Each mirror element must be individually handled because of the accuracy required in assembling the mirrors to the housing. This is a substantially difficult and time consuming process because of the small size of the mirrors. The assembly process may further necessitate manual alignment of the mirror array component relative to the remaining optical components of the system. Such individualized construction and alignment procedures are time consuming and costly.

An alternative approach involves plastic molding of the entire array. Although this process provides a low-cost component, current plastic molding technology produces mirror surfaces having a degree of flatness that is insufficient for the intended use of the mirrors. Moreover, because the mirrors are oriented at different angles with respect to the laser beam, each mirror requires a different dielectric coating to reflect the beam. It is difficult and time consuming to provide such coatings in an assembly of mirrors.

Therefore, it is desirable to provide a deflection mirror tower having a plurality of mirrors precisely arrayed along a contoured surface thereof for use in a multiple-disk optical storage device.

It is also desirable to provide a method for mass producing deflection mirror towers, which, if manufactured using existing processes, may be impractical and too costly.

In addition, it is desirable to provide a fabrication process that enables installation of mass produced deflection mirror towers in a storage drive without further adjustment of the mirrors.

SUMMARY OF THE INVENTION

Briefly, a deflection mirror tower (DMT) of a multiple-disk array, optical storage system comprises a plurality of prism members arranged along a vertical axis of the DMT, the axis being parallel to the rotating axis of the disks. Each prism member has a mirror surface facing along the optical path to the disk array and having a predetermined angular orientation to deflect an optical beam to a respective disk surface.

In accordance with the invention, the DMT is fabricated using a two-level partitioning process. The process begins with the preparation of a set of glass substrates in the form of thick, rectangular plates. One surface of each plate is made optically smooth, e.g., by grinding. A reflective dielectric coating is then applied to that surface. Ultimately, each of the plates will be cut into mirrors whose angle of reflection will be the same, but will be different from that of the mirrors cut from each of the other plates. Accordingly, the reflective coating differs among the respective plates according to the angles of reflection of the mirrors to be cut therefrom.

Next, each of the plates are sliced into bars whose top surfaces are the reflective surfaces. In each plate, the angle of the slices relative to the reflective surfaces depends on the angle of reflection of the mirrors to be made from the plate. A set of bars, one from each plate, is then stacked to form a block with the reflective surfaces of the bars forming a continuous, segmented surface of the block. Specifically, the slice surfaces of adjacent bars are bonded together and the angles of the slices relative to the mirror surfaces of the bars provide coarse control of the orientations of the mirror surfaces relative to each other. Fine adjustment of the orientations, as needed, can easily be provided by shims before the bars are bonded together. Finally, the block is sliced transversely to the bars to provide a plurality of DMT's.

It will be apparent that the overall process provides for precise, yet low-cost, fabrication of the DMT's. For example, large mirror surfaces are prepared and coated, so that the cost of preparing each mirror is minimal. Moreover, the preparation and handling of the relatively large bars to provide precise mirror orientations is also a relatively low-cost procedure, whose cost is divided among a number of DMT'S.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
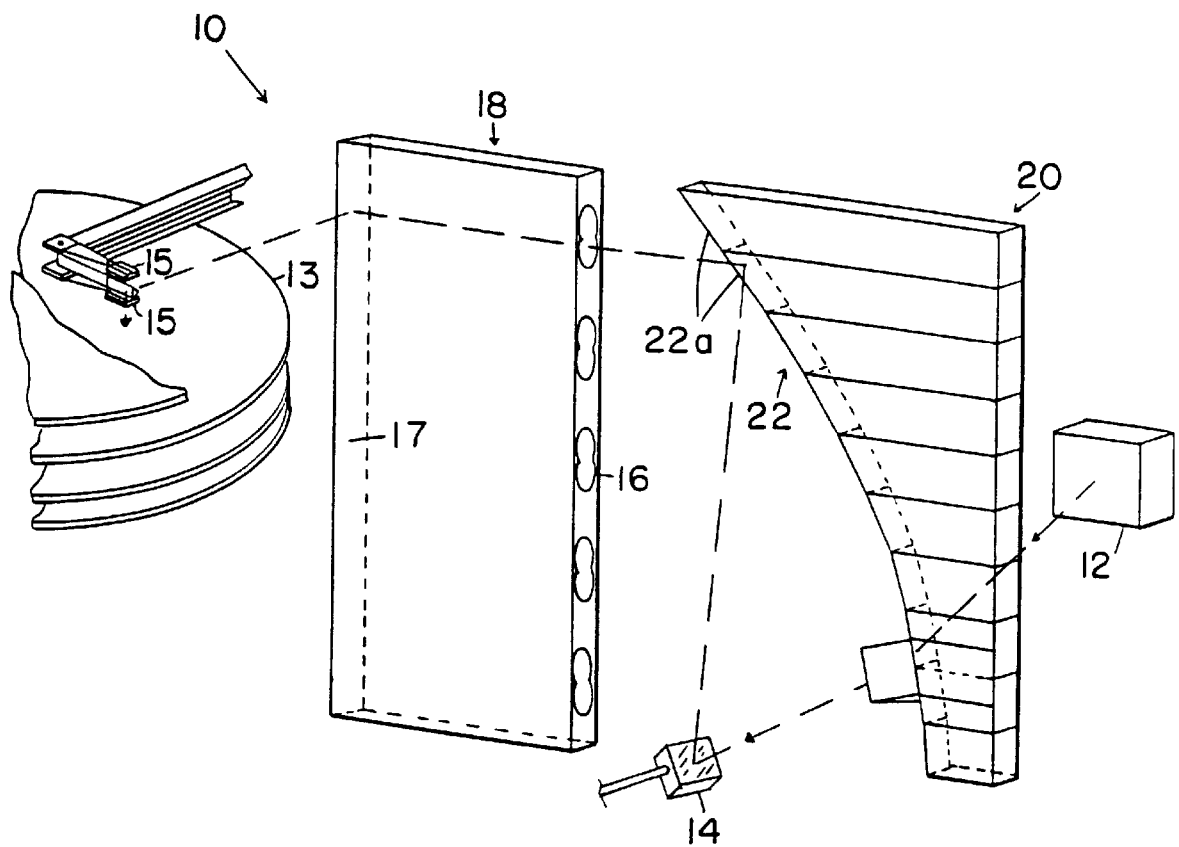
FIG. 1 is a diagram of an optical beam distribution system for a multiple-disk, magneto-optical storage device in which the method and apparatus of the present invention may be utilized.

FIG. 1 depicts an optical beam distribution system 10 for a multiple-disk array, magneto-optical storage device. The beam distribution system 10 includes a stationary optics package 12 for generating a laser beam and a galvanometer-controlled mirror, i.e., "galvo mirror" 14, for distributing the beam to one of several optical head assemblies 15, each of which is associated with a recording surface of an optical disk 13. The galvo mirror 14 distributes the beam to a deflection mirror tower (DMT) 20 having a multi-faceted mirror surface 22 arranged to deflect the beam so that it is passed to a head assembly 15 of a selected disk. Specifically, each facet 22a of the surface 22 is positioned at the same height as a corresponding head assembly 15 and it is oriented so as to reflect the beam from the galvo mirror 14 horizontally toward a lens/mirror set 16,17 contained in a lens/mirror tower (LMT) 18. The lens/mirror set 16,17 redirects the beam to the corresponding head assembly 15.

Figure 2:
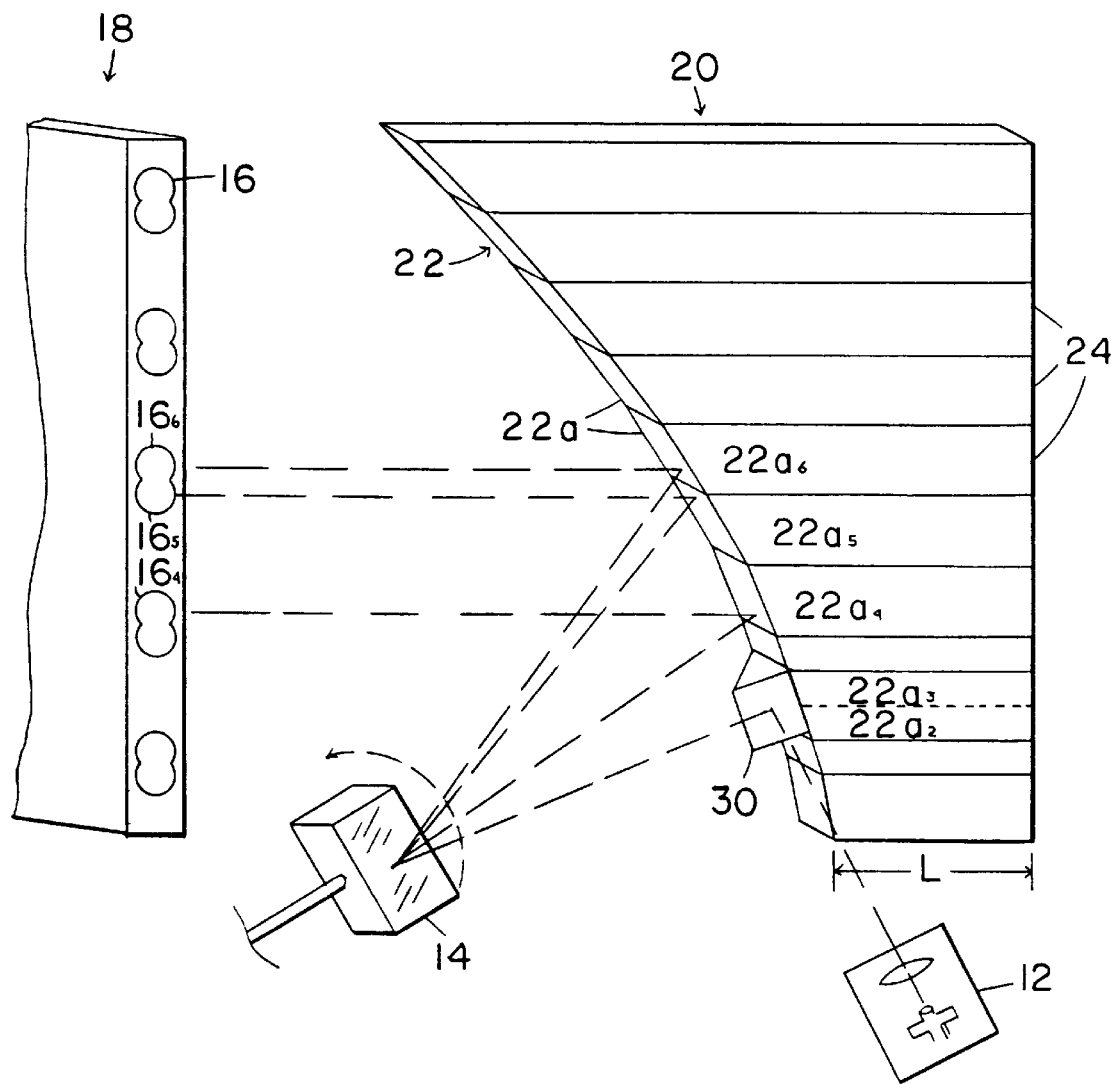
FIG. 2 is a perspective view of a deflection mirror tower (DMT) in accordance with the invention.

Referring also to FIG. 2, a DMT 20 is shown comprising a plurality of discrete prism members 24 featured together as a block. Each member 24 has a surface that provides one of the mirror facets 22a. In an exemplary embodiment of the invention, the storage device includes six optical disks with ten recording disk surfaces, each having an associated optical head assembly 15. The distance between head assemblies 15 associated with opposite surfaces of a disk 13 is approximately 8.0 millimeters (mm), while the distance between head assemblies of opposing surfaces of adjacent disks is approximately 6.0 mm. As will be described herein, each member 24 of the DMT 20 has a predetermined thickness; however, only a specific portion of the mirror facet 22a of each member is used, depending upon the position of the corresponding head assembly 15 within the disk array and height of the corresponding imaging lens 16.

For example, as shown in FIG. 2, the imaging lenses $16 5_5$ and $16_6$ are close together and the lenses $16_4$ and $16_5$ are relatively far apart. Thus, the lower portions of the mirror facets $22a_4$ and $22a_6$ and the upper portion of the facet $22a_5$, which are opposite these lenses, are involved in beam reflection. On the other hand, the upper portions of the mirror facets $22a_4$ and $22a_6$ and the lower portion of the facet $22a_5$, which are not opposite any lenses, are "dead space". The dead space on the facets $22a_2$ and $22a_3$ accommodates a 45° relay mirror 30 that reflects the beam from the optics package 12 to the galvo mirror 14.

As shown in FIGS. 1 and 2, the DMT 20 is configured such that the distance the laser beam travels from the optics package 12 to an imaging lens 16 of the LMT 18 is substantially the same regardless of which mirror facet 22a reflects the beam. Accordingly, the lengths L of the members 24 progressively increase from the bottom of the DMT 20 to the top to provide a generally arcuate contour mirror 22.

As will be described further herein, each member 24 is sliced from a base substrate having a flat mirror surface that is polished and coated with an appropriate reflecting coating. Angular slicing of the substrate results in each member having a generally linear, yet obliquely oriented mirror surface; further, the orientation of each mirror surface is dependent upon its location on the DMT. When assembled vertically and parallel to the rotating axis of the optical disks, each member is an integral part of the multi-faceted, generally arcuate mirror 22 of the DMT 20 configured to deflect the optical laser beam to a precise location on a respective disk surface. The illustrated DMT 20 includes ten mirror facets 22a positioned at non-complex angles to ensure that the beam travels orthogonally to its respective disk surface.

Figure 3A:
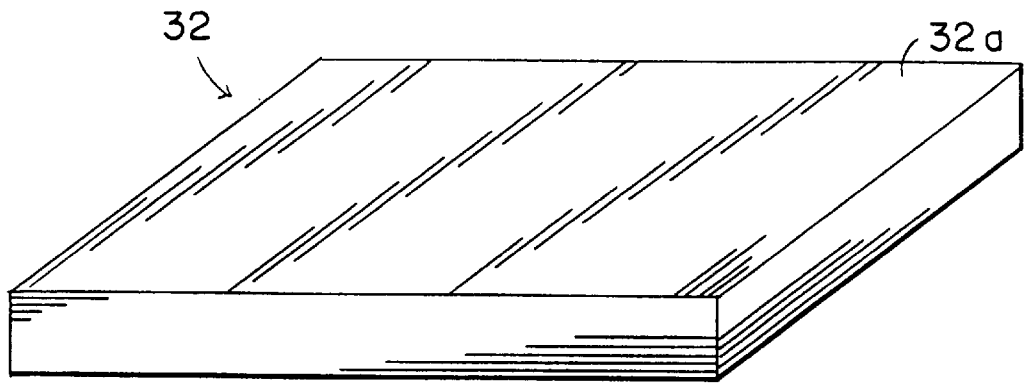
FIG. 3A is a schematic diagram of a base substrate used to fabricate the DMT of FIG. 2.

Each DMT 20 is preferably formed from a plurality of base substrates, one for each recording disk surface of the optical drive. FIG. 3A is a schematic diagram of a generally long, rectangular substrate 32, which is preferably made of a glass material, such as boro silicate crown glass. As noted, the long glass substrate provides a significant motivation for the invention because it is easy to handle, especially when preparing the mirror surface, as follows. Specifically, the top surface 32a of the substrate 32 is "polished" to a smooth surface using a conventional polishing machine. The surface 32a is then coated with an appropriate multi-layer dielectric reflecting material, such as titanium dioxide ($TiO_2$) and silicon dioxide ($SiO_2$), using a conventional evaporation process. Selection of the appropriate reflecting coating depends upon a number of criteria, including (i) the wavelength of the laser beam; (ii) the angle of incidence of the beam with respect to each mirror of the DMT; (iii) the desired reflectivity; and (iv) maximum phase shift related to polarization.

Figure 3B:
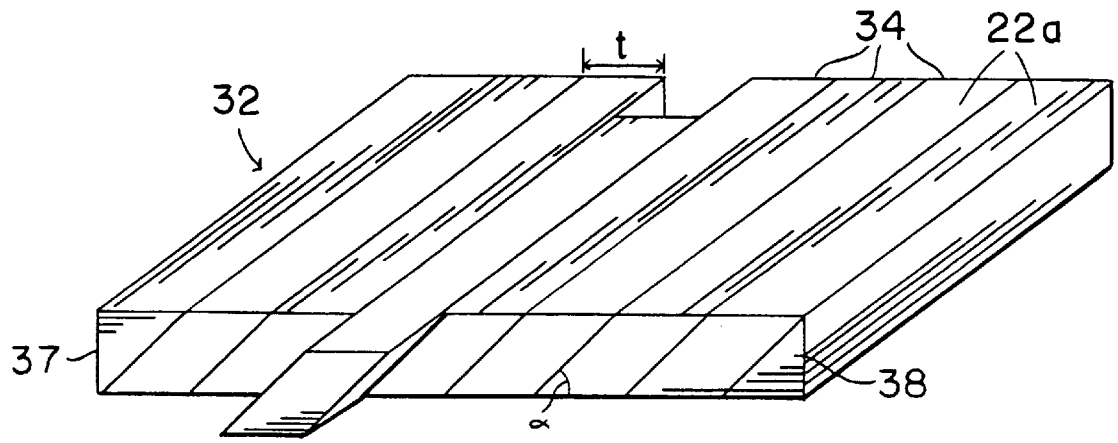
FIG. 3B is a schematic diagram of the substrate of FIG. 3A sliced into a plurality of "positive" bars having a predetermined thickness and angular orientation.
Figure 3C:
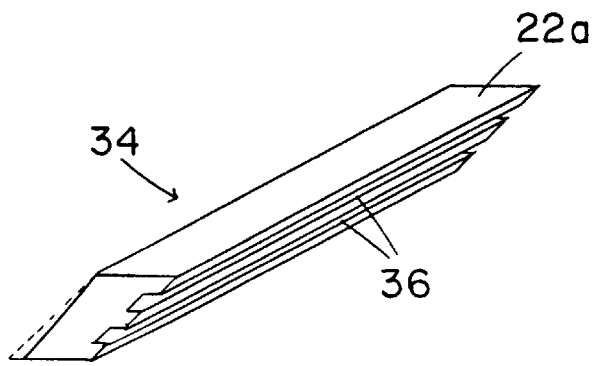
FIG. 3C is a schematic diagram of a tapered positive bar having a pair of shallow capillary grooves formed along a side thereof.

Each substrate 32 is then sliced lengthwise into a plurality of "positive" bars 34, each having a mirror surface 22a and having a thickness t and angular orientation, as shown in FIG. 3B. As will be seen, the bars 34 are the foundation of the DMT component. Slicing is preferably accomplished with a conventional ultrasonic cutter or diamond wheel cutter. The bars 34 are then preferably shaved to a slightly tapered configuration (FIG. 3C) and a pair of shallow capillary grooves 36 are formed lengthwise along one side of each bar 34 to facilitate bonding, as described below. The end pieces 37 and 38 of the substrate 32 are discarded. The bars 34 originating from a specific substrate 32 are substantially similar in shape and dimension; however, the bars originating from different substrates have generally different dimensions.

Figure 4:
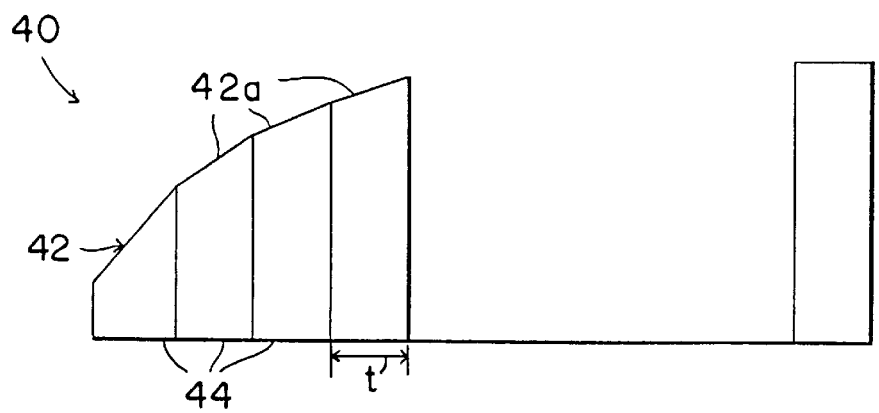
FIG. 4 is a diagrammatic view of a "negative" master assembly used as a reference to facilitate alignment and proper angular orientation of the positive bars during fabrication of the DMT in accordance with the invention.

FIG. 4 depicts a "negative" master assembly 40 for use as a reference to facilitate alignment and proper angular orientation of the positive bars 34 when assembling a DMT 20. The mating surface 42 of the master assembly 40 is precisely shaped with a contour that conforms to the desired contour of the DMT mirror surface 22. Specifically, negative master bars 44 are preferably sliced from a glass substrate (not shown) in a tapered arrangement similar to formation of the positive bars 34. The master substrate has a slightly different glass composition from that of its positive counterpart, so that the master 40 has a different thermal coefficient of expansion.

Figure 5:
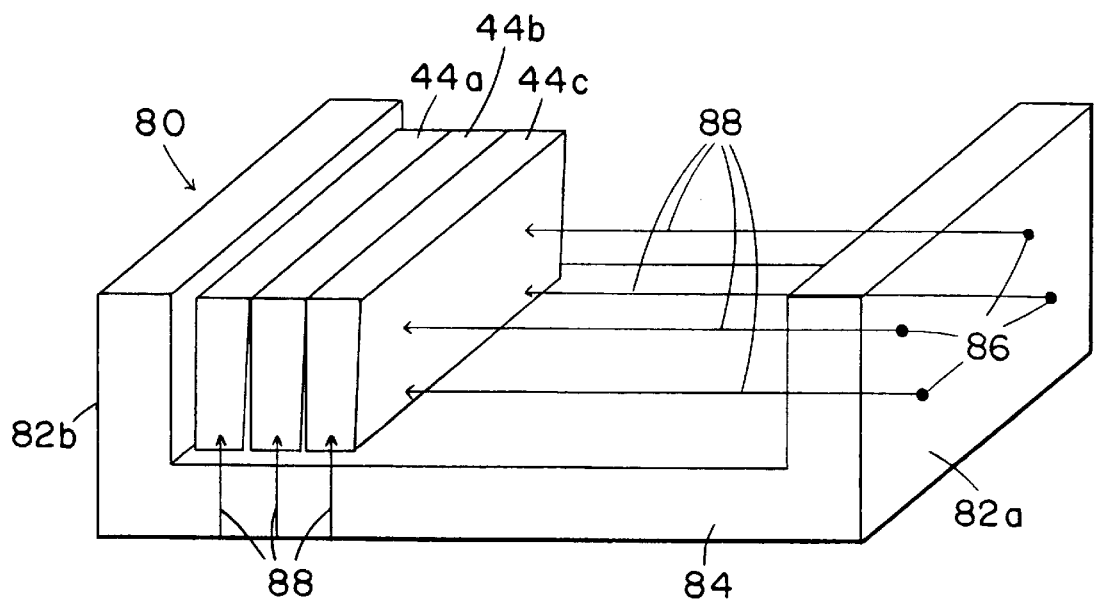
FIG. 5 is a perspective view of a fixture used to fabricate the master assembly of FIG. 4.

The negative bars 44 are preferably calibrated and aligned using a fixture 80 depicted in FIG. 5. The fixture 80 is a generally U-shaped member having sides 82a,b and a bottom surface 84. A plurality of holes 86 located in side 82a and bottom 84 (not shown) accommodate screws 88 used to adjust the bars to a proper position, as described below.

Specifically, a first negative bar 44a is inserted into the fixture 80, with the surface 42a (FIG. 4) facing upwardly. The bar 44a is fixed in place against the side 82b and aligned with an autocollimator (not shown) that is used to calibrate the remaining negative bars. Calibration is generally performed with the autocollimator by generating a laser beam, directing it to the surface 42a of the bar 44a and then analyzing the reflected beam. Comparison of the generated beam and reflected beam indicates the angle of incidence at the surface 42a. Because of their tapered configuration, the negative bars 44 may be physically adjusted by the screws 88 to present a desired angle at the surface 42a.

A second negative bar 44b is then inserted into the fixture 80, adjacent to the first bar 44a with their surfaces 42a disposed in frictional contact relation. The second bar 44b is thereafter calibrated, adjusted (if necessary) and bonded to the first bar 44a with an optical adhesive, such as ultra-violet (UV) cured glue. The calibration and bonding procedure is repeated with each bar 44 until the master assembly 40 is completed.

Figure 6A:
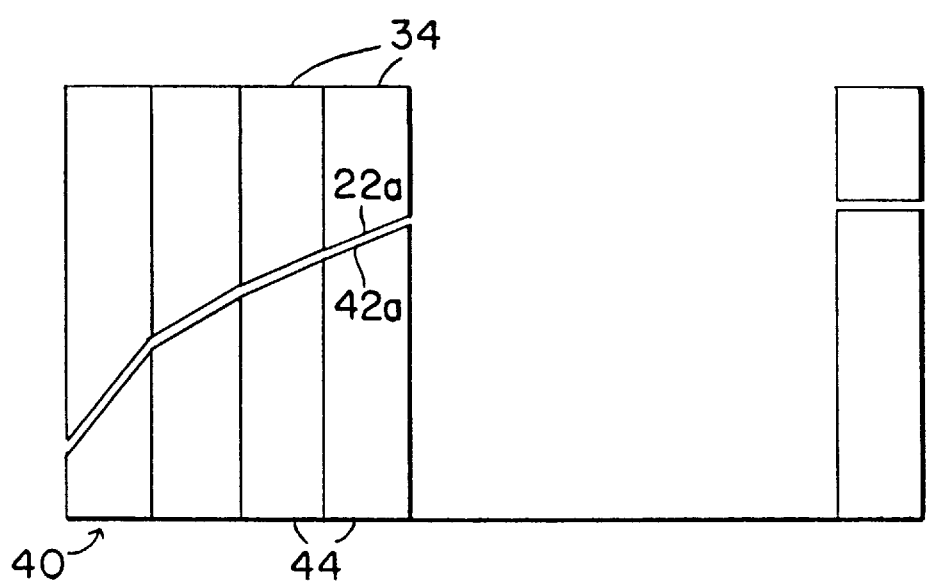
FIG. 6A is a diagrammatic view of the master assembly in mating relation to the positive bars during fabrication of the DMT.

As noted and referring to FIG. 6A, the master assembly 40 facilitates alignment and proper angular orientation of the DMT mirror surface 22 (FIG. 2); this is accomplished by disposing each positive bar mirror facet 22a in contact with a respective facet 42a of the master mating surface 42. Specifically, a "color contact" technique is employed to ensure proper alignment between the bars 34 and master assembly 40. In addition, the contact technique facilitates separation of the bars after bonding. Color contact generally involves disposing a small amount of liquid, such as alcohol or water, on the mirror facet 22a of each positive bar 34 prior to mating contact with the master 40. Thereafter, the facet 22a is joined in frictional contact relation to a respective mating facet 42a of a negative bar 44, the mating facet 42a having a similar, but opposite, angular orientation to that of the mirror facet 22a. This provides substantial conformance of the mirror facet 22a to the counter-angular mating surface orientation of the master assembly 40. Moreover, color contact enables very tight tolerances on angles of each of the positive bars 34 since conformance with the master may be monitored by observation of resultant color fringes.

Figure 6B:
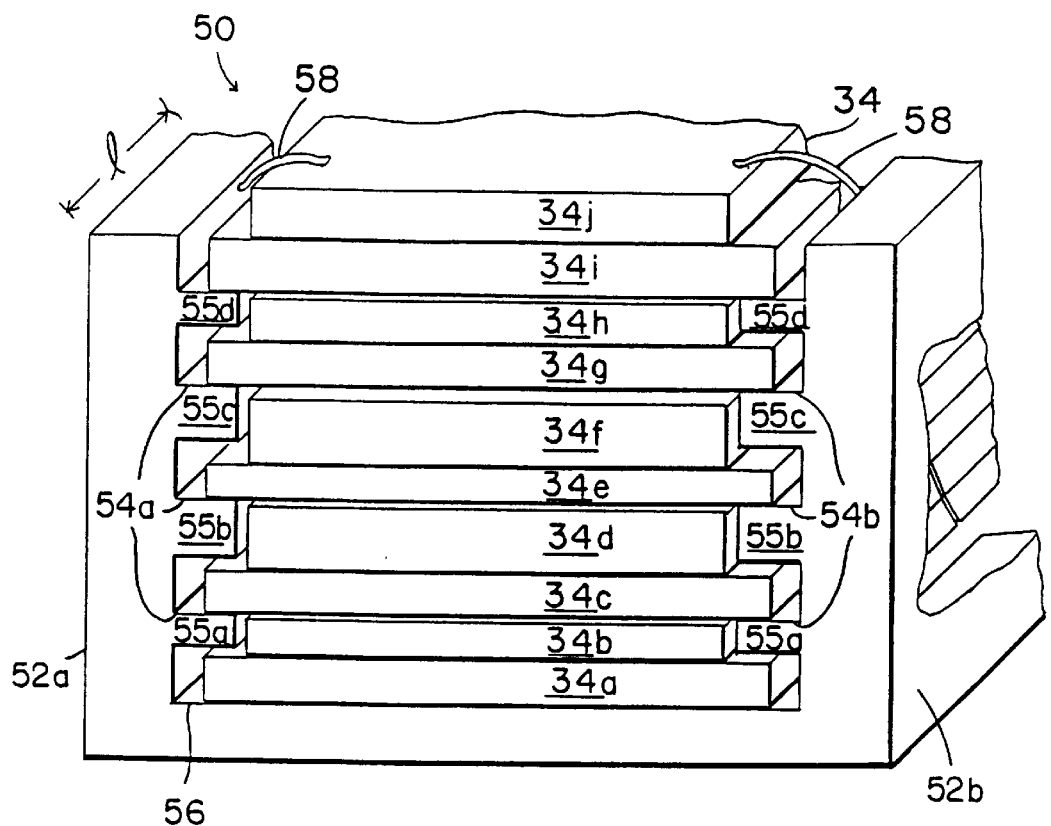
FIG. 6B is a perspective view of an embodiment of a datum reference fixture used during the fabrication of the DMT.

Operationally, each positive bar 34 is inserted into a mating fixture configured to enclose the master assembly 40 and subsequently is affixed to a respective bar 44 of the master. FIG. 6B illustrates an embodiment of a datum reference fixture 50 used during the DMT fabrication process. The fixture 50 encompasses the master 40 so that the mirror facet 22a of each positive bar 34 may be secured in color contact to the mating facet 42a of a respective bar 44. The fixture 50 is configured to align the positive bars 34 to the master 40 by limiting lateral displacement of the bars 34. This process also minimizes scratching of the negative master 40.

Specifically, each positive bar 34 stacked in vertical alignment in the datum reference fixture 50, which is a generally U-shaped member assembly having sides 52a,b preferably configured as ladders with a plurality of reference steps 54a,b. Each step 54a is substantially identically-positioned in opposing, facing relation to a respective step 54b. The steps 54a,b function as datum points, hereinafter generally designated 55, and the generally planar bottom surface 56 of the fixture 50 functions as a datum surface. In a preferred embodiment, the sides 52a,b are generally equal in length 1 to the secured bars and the fixture 50 has a back surface (not shown) that limits the rearward displacement of the bars. In the illustrated example, there are four datum points (four steps on each side) for the fixture 50, with each datum configured to provide a predetermined arrangement of the positive bars 34 in relation to the spacing of the disks of the disk array, as described below.

A first positive bar 34a is inserted into the fixture 50, with the surface 22a (FIG. 4) facing inwardly. The bar 34a is placed upon the datum surface 56 and is subsequently affixed to the respective bar 44. Because of its tapered configuration, the positive bar 34a may be physically adjusted to present the desired mating contact at the surface 42a. In accordance with the teachings of the invention, the extended length of the bars 34 reduce their sensitivity during the adjustment and alignment process.

A second positive bar 34b is then inserted into the fixture 50, adjacent to the first bar 34a with their surfaces 22a disposed in frictional contact relation. Here, datum points 55a are not used because the intersection between the first and second bars corresponds to the relatively close spacing (2.94 mm) between head assemblies 16 (FIG. 1) of adjacent disk surfaces. Because the datum points 55a are not utilized, the second bar 34b has a narrower width relative to the first bar 34a to avoid contact with the projections 55a. The second bar 34b is thereafter adjusted (if necessary) and clipped to the first bar 34a using clips 58.

A third positive bar 34c is then inserted into the fixture 50 and placed upon the first datum points 55a. The distance between the datum surface 56 and first datum points 55a corresponds to the relatively greater spacing (7.86 mm) between head assemblies 15 on either side of a disk. It can therefore be appreciated that the remaining interfaces between the third (34c) and fourth (34d) bars, the fifth (34e) and sixth (34f), the seventh (34g) and eighth (34h), and the ninth (34i) and tenth (34j) bars 34 are not aligned to respective datum points 55b, 55c, 55d, whereas the fifth (34e), seventh (34g) and ninth (34i) bars do utilize the respective datums 55b, 55c, 55d. The adjustment procedure is repeated with each bar 34 until each positive bar is aligned with respective bars 44 of the master assembly 40.

Once aligned, the positive bars 34 are bonded to each other by an adhesive, such as UV glue. The adhesive is preferably applied by a conventional capillary/vacuum process, which entails placing the loaded bar fixture 50, including the master 40, into a vacuum chamber, pouring the glue into the capillary grooves 36 formed along the sides of the bars 34 and then releasing the vacuum to suck the glue into the grooves. Application of UV light subsequently cures the glue.

Figure 6C:
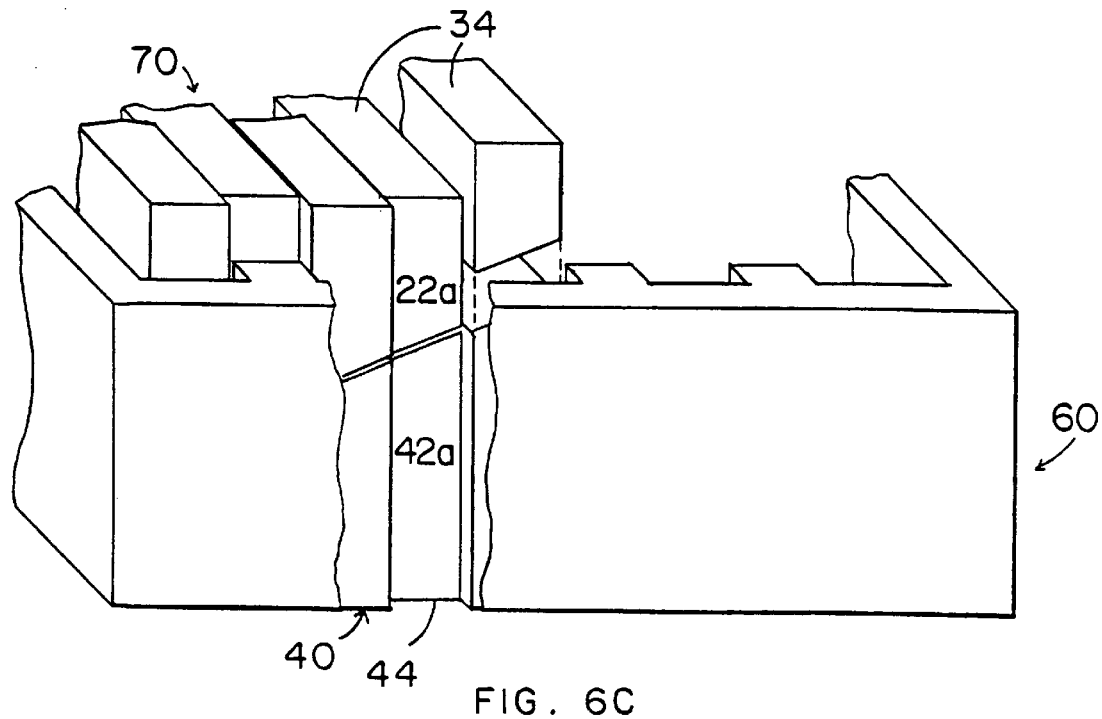
FIG. 6C is a perspective view, partially broken away, of an alternate embodiment of the fixture of FIG. 6B.

An alternate embodiment of the datum reference fixture is shown in FIG. 6C. Here, each positive bar 34 is inserted into a mating fixture 60 configured to enclose the master assembly 40 and subsequently is affixed to a respective bar 44 of the master. It can be seen that the mating fixture 60 is substantially similar to the datum reference fixture 50; however, the fixture 60 is arranged to encompass the master 40 such that the mirror facet 22a of each positive bar 34 may be lowered over and secured in color contact to the mating facet 42a of a respective bar 44. The fixture 60 is configured to align the positive bars 34 to the master 40 by limiting lateral displacement of the bars 34. This process also minimizes scratching of the negative master 40. Repetition of this procedure for each bar type results in the creation of a "positive" bar stack 70 once the aligned bars 34 are bonded to each other.

Figure 7:
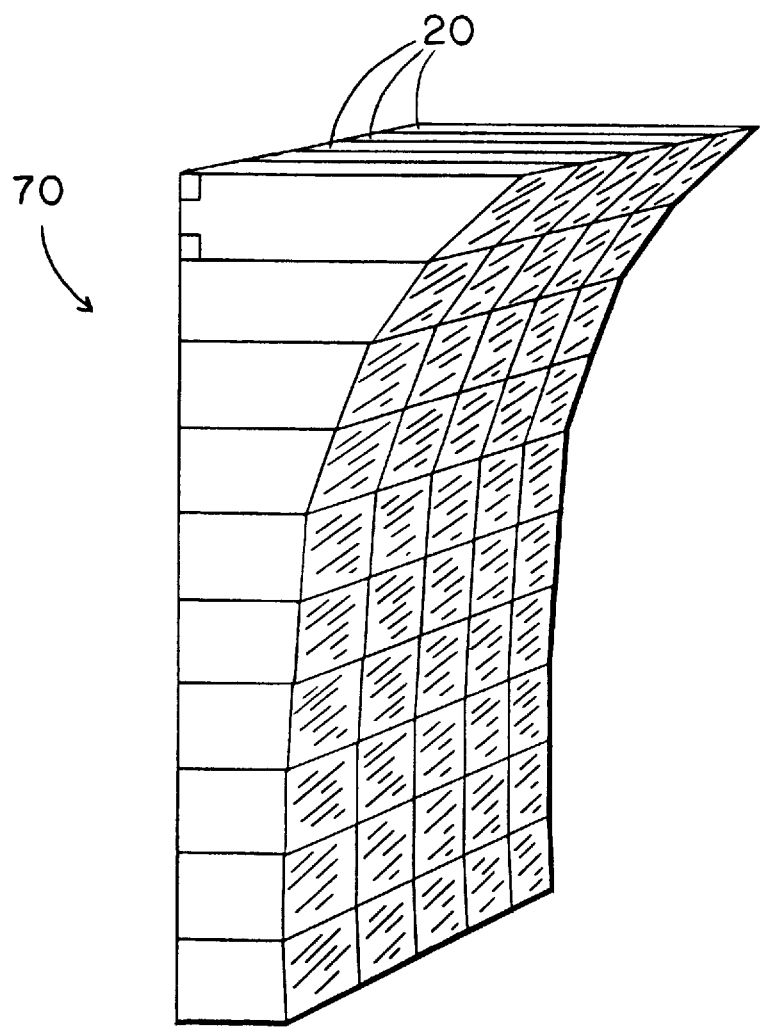
FIG. 7 is a perspective view of a positive bar stack sliced into individual DMT units in accordance with the invention.

Because of the different thermal coefficients of expansion of their materials, the positive bar stack 70 and master assembly 40 may be immersed into hot water (approximately 70° F.) to facilitate separation; thereafter, they may be easily separated by applying pressure to their interface (snapping). The fixture 60 may then be removed and the positive bar stack 70 is sliced into individual DMT units 20, as depicted in FIG. 7, using an ultrasonic cutter or conventional diamond wheel cutter.

The 45° relay mirror 30 is then affixed to the DMT unit 20 preferably at a location defined by the dead space on the facets $22a_2$ and $22a$ (FIG. 2). The relay mirrors are formed by slicing a rectangular glass substrate into a plurality of generally triangular substrates. The sides of each substrate are then coated with a generally reflective material. The resulting relay mirror 30 is bonded to the DMT 20 using a 3-dimensional fixture (not shown) adapted to accurately position the mirror upon the arcuate surface 22 of the DMT. Accordingly, the invention provides a high-precision, deflection mirror tower capable of high-volume, repeatable production at low-cost.

The foregoing description has been directed to specific embodiments of this invention. It will be apparent, however, that variations and modifications may be made to the described embodiments, with the attainment of some or all of their advantages. Therefore, it is the object of the appended claims to cover all such variations and modifications as come within the true spirit and scope of the invention.

What is claimed is:

1. An optical component comprising a plurality of discrete prism members stacked and featured together as a block, each of said members having a flat reflective surface, the prism members stacked and featured together such that the flat reflective surfaces are oriented to define a multi-faceted mirror surface on a generally arcuate shaped side of said block.

2. The component as in claim 1, wherein said prism members are of varying lengths.

3. The component as in claim 2, wherein said block is formed with said prism members stacked in an arrangement with the shortest prism at one end of said block, and the remaining prism members are stacked in order of increasing length.

4. The component as in claim 1, wherein one of said prism members includes a glass material.

5. The component as in claim 4, wherein said glass material includes boro silicate crown glass.

6. The component as in claim 1, wherein one of said reflective surfaces includes a reflective coating.

7. The component as in claim 6, wherein said reflective coating includes titanium dioxide ($TiO_2$) and silicon dioxide ($SiO_2$).

8. The component as in claim 1, wherein two prism members are bonded together by means of a bonding agent.

9. The component as in claim 8, wherein said bonding agent is an ultra-violet cured glue.

10. The component as in claim 8, wherein one of said prism members is grooved on one of its sides, and said bonding agent is disposed within said groove.

11. An optical component comprising a plurality of discrete prism members stacked and featured together as a block, each of said members having an angular mirror surface, the prism members stacked and featured together such that the annular mirror surfaces define a multi-faceted mirror surface on an arcuate shaped side of said block, wherein said prism members are of varying lengths, and wherein said block is formed with said prism members stacked in an arrangement with a shortest prism at one end of said block, and remaining prism members are stacked in order of increasing length.

12. An optical component, comprising a plurality of discrete prism members stacked and featured together as a block, each of said members having an angular surface oriented as a mirror facet, said mirror facets together defining an arcuate shaped side of said block, wherein one of each adjacent pair of said prism members has grooves on its side facing the other prism member of the pair, and wherein said prism members are bonded together by means of a bonding agent disposed within said grooves.

13. A method of fabricating an optical component comprising the steps of:

stacking a plurality of discrete prism members in a block like structure, each member having a flat reflective surface oriented as a mirror facet, the totality of mirror facets defining a multi-faceted mirror surface on a generally arcuate shaped side of said block;

disposing a bonding agent in a groove defined on one side of each of the prism members; and bonding the prism members together.

* * * * *